United States Patent [19]
King et al.

[11] 3,862,895
[45] Jan. 28, 1975

[54] SELF-COMPENSATING ELECTRODE SYSTEM

[75] Inventors: Karl Lewis King, Milwaukee; James R. Arrington, Muskego, both of Wis.

[73] Assignee: Great Lakes Instruments, Inc., Milwaukee, Wis.

[22] Filed: Sept. 5, 1972

[21] Appl. No.: 286,156

Related U.S. Application Data
[62] Division of Ser. No. 43,864, June 5, 1970, Pat. No. 3,709,796.

[52] U.S. Cl...... 204/195 R, 204/195 G, 204/195 M
[51] Int. Cl....................... G01n 27/36, G01n 27/46
[58] Field of Search............ 204/1 T, 195 R, 195 G; 324/29, 30 R

[56] References Cited
UNITED STATES PATENTS

| | | | |
|---|---|---|---|
| 2,927,888 | 3/1960 | Beard............................... | 204/195 R |
| 3,218,242 | 11/1965 | Capuano......................... | 204/195 R |
| 3,247,452 | 4/1966 | Kordesch ........................ | 204/195 R |
| 3,306,837 | 2/1967 | Riseman et al. ................ | 204/195 G |
| 3,405,048 | 10/1968 | Soltz .............................. | 204/195 R |
| 3,479,255 | 11/1969 | Arthur............................. | 204/1 T |
| 3,629,089 | 12/1971 | Luck ............................... | 204/1 T |
| 3,649,504 | 3/1972 | Evans et al...................... | 204/195 R |
| 3,707,455 | 12/1972 | Derr et al........................ | 204/195 P |

FOREIGN PATENTS OR APPLICATIONS

| | | | |
|---|---|---|---|
| 1,128,685 | 4/1962 | Germany ......................... | 204/195 G |
| 271,717 | 11/1961 | Netherlands..................... | 204/195 G |

*Primary Examiner*—T. Tung
*Attorney, Agent, or Firm*—Ralph G. Hohenfeldt; Fred Wiviott

[57] ABSTRACT

An electrode type sensing device which employs two separated measuring electrodes of the same type and a common ground for making electrode potential determinations such as dissolved oxygen and pH measurement in a liquid. In one embodiment, one of the measuring electrodes is disposed in a standard solution which is placed in but sealed from the material to be tested except for an electrical communication. In an alternative embodiment, both measuring electrodes are placed in a material, the ion or molecular content of which is to be measured but, at a substantial distance from each other and with a common ground. Both embodiments eliminate the previous problem of temperature and other environmental aspects which affect a reference electrode and the measuring electrode in a different manner.

3 Claims, 5 Drawing Figures

SELF-COMPENSATING ELECTRODE SYSTEM

This is a division, of application Ser. No. 43,864, filed June 5, 1970, now U.S. Pat. No. 3,709,796.

BACKGROUND OF THE INVENTION

This invention relates to an electrode system and process therefor for sensing differences between a control object and an unknown object by employing two electrodes, one in communication with the unknown object and one in communication with the known object. More particularly, the invention relates to a device for measuring ion or molecular concentrations, or electrode potentials in a solution wherein both the electrodes are of the measuring type and a differential amplifier is employed which is commonly grounded with the two sensing electrodes.

Electrode measuring devices of the general type concerned with in this invention are described in U.S. Pat. Nos. 3,218,242; 3,219,556; and 3,294,652. As indicated in the prior art, the standard method of using specific ion electrodes for making electrode potential measurements is to employ a specific ion or other electrode in conjunction with a reference electrode which is usually of the silver-silver chloride or calomel type. The potential between the two electrodes is then a logrithmic measure of the desired ion concentration. The disadvantages in employing the prior art devices are that the reference electrode potential will vary in an unrelated manner to environmental factors such as temperature, age of materials, absorbtion of moisture, et cetera. It will also vary should the electrolyte solution become contaminated. An electrode system which employs a temperature compensating diode means is described in U.S. Pat. No. 3,405,048. It is also known in the prior art to employ two measuring electrodes in conjunction with a single reference electrode. This system employs two amplifiers one for each measuring electrode with the reference electrode being connected to both amplifiers. The prior art nowhere teaches an electrode system wherein two measuring electrodes of the same type are placed in a solution and are interconnected to an amplifier which in turn is connected to a measuring meter with the two electrodes being commonly grounded with the meter. Neither does the prior art disclose an electrode system wherein one measuring electrode is placed in a solution of known ion or molecular content and the other measuring electrode of the same type is placed in the solution to be measured with the electrode placed in the known solution being in electrical contact with the other measuring electrode and both electrodes commonly grounded to a high impedance differential amplifier.

It is an object of the present invention to provide a novel sensing means which has a minimum number of parts yet is highly effective under various conditions of use. It is another object of this invention to provide an electrode system and method of measuring ion or molecular concentrations, or electrode potentials in a solution wherein two measuring electrodes are employed without a reference electrode. It is still another object of the present invention to provide an electrode system of measuring ion concentrations wherein a measuring electrode of the same type as a second measuring electrode is placed in a standard solution in electrical communication with the solution to be measured. It is yet another object of this invention to provide a system for measuring ion concentrations wherein two measuring electrodes are spaced from each other in a solution and are commonly grounded. Another object is to provide an electrode measuring device adaptable to monitoring stream and lake conditions for the purpose of abating pollution. A still further object is to provide a system which eliminates signal contamination due to stray electrical noise pickup.

SUMMARY OF THE INVENTION

The foregoing objects are accomplished and the shortcomings of the prior art are overcome by the present electrode system which is comprised of a first measuring electrode and a second measuring electrode of the same type as the first, both of which are commonly grounded to an indication means which senses differences between the two electrodes. In one embodiment, one measuring electrode is placed in a known solution and in electrical contact with the other measuring electrode but sealed from the solution to be measured, whereas in another embodiment the two measuring electrodes are spaced a substantial distance from each other in the same solution.

BRIEF DESCRIPTION OF THE DRAWING

A better understanding of the present process and device for effecting it will be accomplished by reference to the drawings wherein.

BRIEF DESCRIPTION OF THE PREFERRED EMBODIMENT

Figure 1:
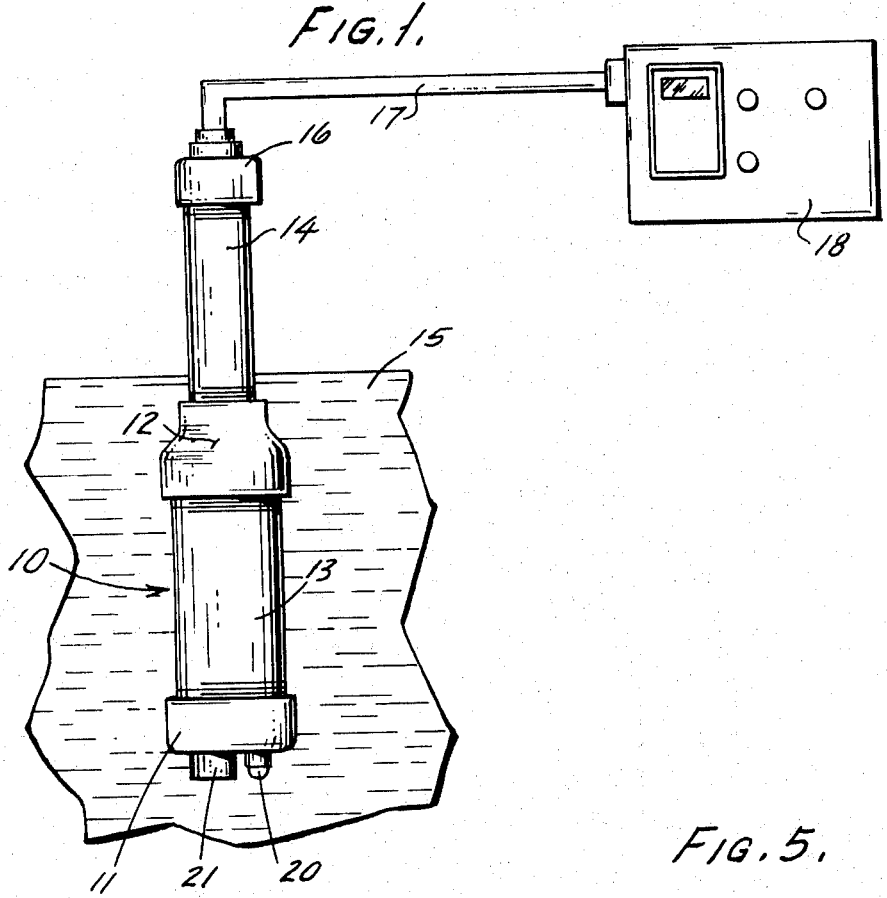
FIG. 1 is a side elevational view of the electrode probe device positioned in a body of water and operatively connected to a control box.
Figure 2:
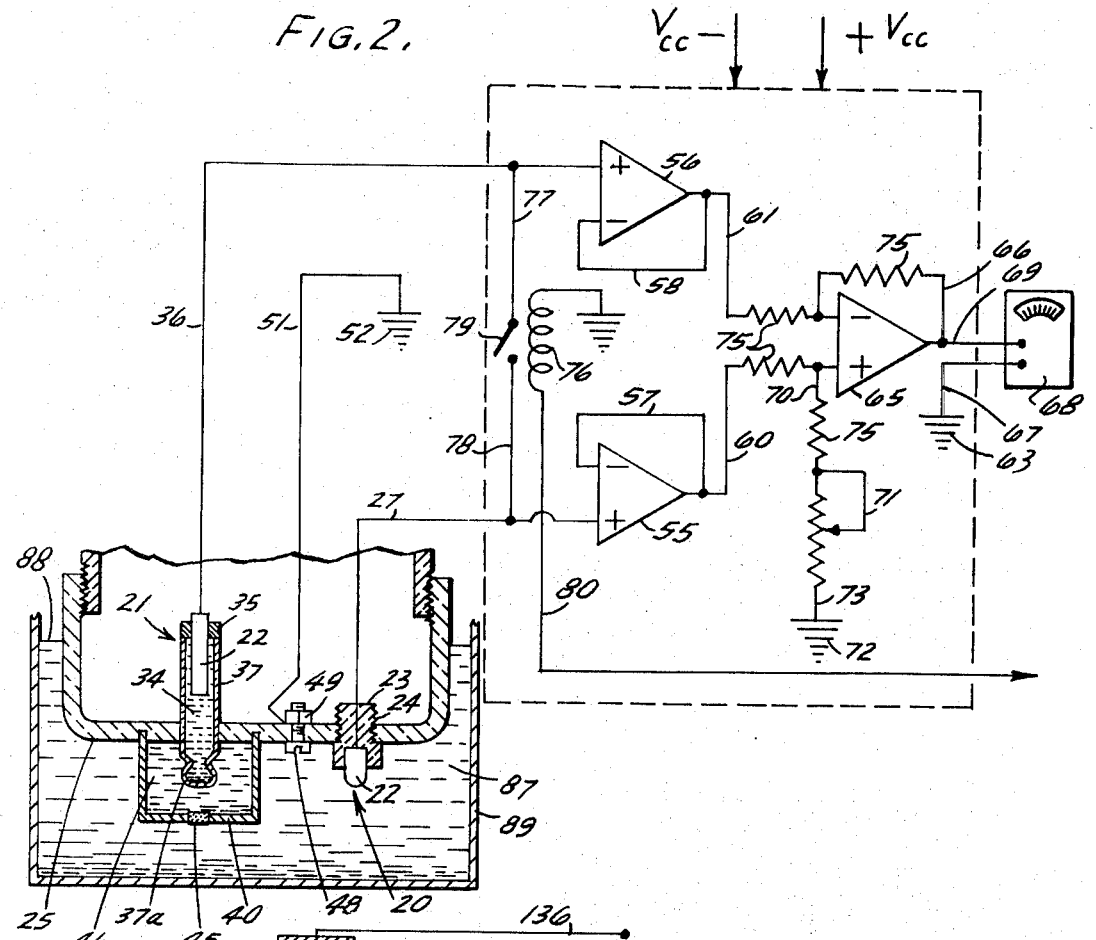
FIG. 2 is a view in vertical section of a preferred embodiment of the electrode device and a diagramatic view of the electrical components.

Proceeding to a detailed description of the present invention, and FIG. 1 in particular, a sensing probe 10 is fabricated from two end cap portions 11 and 12 and a central tubular section 13. A tubular shank portion 14 extends above water level 15, which can be a stream or lake or other electrolytic solution. A sealing cap assembly 16 is disposed on portion 14 through which cable 17 passes from control box 18. As best seen in FIG. 2, disposed within the probe 10 and extending to the exterior thereof is a first measuring electrode unit 20 and a second measuring electrode unit 21. Electrode unit 20 has a sensing electrode 22, which in this instance is composed of an alloy containing 87 percent thallium and 13 percent mercury. The sensing electrode is surrounded by a cylindrical plastic plug member 23 which is screwed through end wall 25 by means of threads 24. A conductor 27 is disposed through plug 24 by means of an accommodating channel and secured by means of epoxy glue. It is secured to electrode 22 in plug 23 by means of soldering.

Electrode unit 21 like electrode unit 20 has a sensing electrode 22 which, unlike sensing electrode 22 in unit 20, is contained within a standard pH sensitive glass electrode blank 37. The glass electrode is filled with an inner filling solution 34 composed of 100 parts of potassium di-hydrogen phosphate at 0.1 molar strength and eleven parts of 0.1 molar sodium hydroxide and two parts of saturated thallium phosphate ($Tl_3PO_4$). This solution simulates a stable dissolved oxygen concentration. A plug 35 seals the solution to prevent oxygen from entering the glass electrode. The glass pH electrode blank 37 prevents diffusion of oxygen into the inner filling solution 34 and also allows electrical connection to outer filling solution 46 and correction of the electrode potential to simulate a specific dissolved oxygen level. The correction is accomplished by varying the pH of the outer filling solution 46. A cylindrical isolating member 40 encompasses the tip of glass blank 37 and is fitted into end wall 25 by means of a circular groove and epoxy cement. A ceramic plug 45 is disposed in member 40 which seals in outer filling solution 46 which in this instance is a phosphate buffer of pH 7.0, yet allows electrical communication with electrode 22. Disposed adjacent isolating member 40 is a screw 48 and nut 49 which secure conductor 51 to end wall 25 with screw 48 acting as a ground.

Conductor 27 leading from electrode unit 20 is connected to the input side of a non-inverting, field effect transistor, high impedance amplifier 55. In a similar manner, conductor 36 connects electrode unit 21 with a non-inverting, field effect, impedance amplifier 56 and on the input side. Each amplifier 55 and 56 is provided with conductors 57 and 58 which provide negative feedback to accomplish the impedance transformation. Conductors 60 and 61 connect the output side of amplifiers 55 and 56 respectively, to the input side of a differential, operational amplifier 65 which also has a conductor 66 leading from the negative input side to the output side. Differential amplifier 65 is interconnected to a meter 68 by means of conductor 69 with meter 68 grounded at 63 through conductor 67. Interconnected with conductor 60 leading to the positive input side of amplifier 65 is conductor 70 connecting with a common mode adjustment potentiometer 71 which is grounded at 72 through conductor 73. The usual resistors 75 are employed in conjunction with amplifier 65 and potentiometer 71. In order to calibrate the electronics a reed relay 76 is provided on the input side of amplifiers 55 and 56 and interconnected by conductors 77 and 78 with switch 79. Conductor 80 provides the necessary lead to a control box 18 which would also include the meter 68 as well as power lines $Vcc^-$ and $Vcc^+$.

DESCRIPTION OF THE ALTERNATIVE EMBODIMENTS

Figure 3:
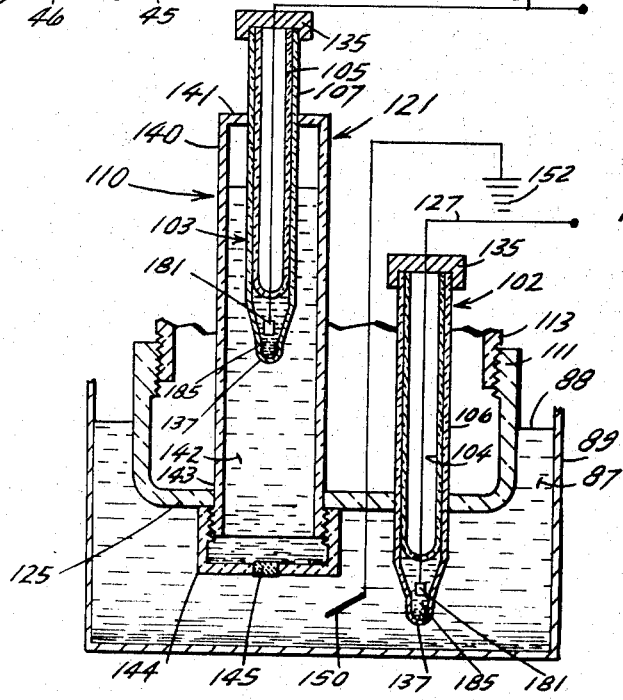
FIG. 3 is a view like FIG. 2 but of an alternative embodiment and without the electrical components.

A detailed description of the alternative embodiments is now given. As the electrode units employed in the alternative embodiments employ many similar components, the same numerals are employed for similar parts except they are used in the "100," "200" and "300" series. Sensing probe 110 as disclosed in FIG. 3 is employed to make pH determinations and includes two standard glass type pH sensing electrode units 102 and 103 such as for example Corning No. 476022. Sensing pH tips 137 enclose sensing electrodes 181 of the standard silver type. In the case of both units 102 and 103 sensing tips 137 are filled with silver chloride solution 185 in contact with sensing electrodes 181. Both electrode units are closed by caps 135 through which are disposed conductors 136 and 127 leading to sensing electrodes 181 at one end and to amplifiers similar to those shown at 55 and 56 in FIG. 2. The other electronic components would be the same as in FIG. 2. Other portions of the probe 110 are the same as probe 10 including cylindrical member 140 enclosed by cap 144 with plug 145. A metallic wire electrode 150 which is preferably platinum but may be any conductive material, is disposed in electrical communication with both sensing and measuring electrodes 181 and electrode 150 is grounded at 152 through conductor 151. Thus, meter 68 and platinum electrode 150 would be commonly grounded.

Figure 4:
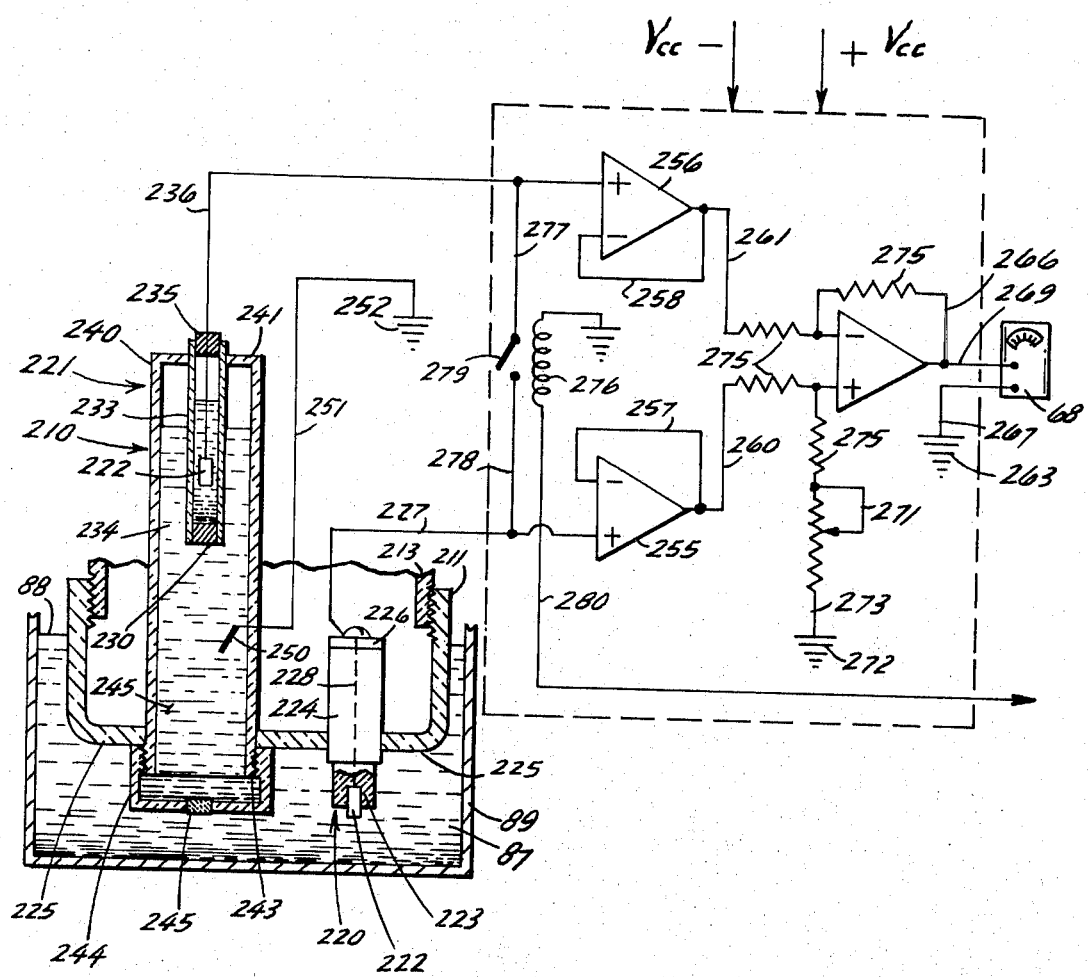
FIG. 4 is a view like FIG. 2 but of still another embodiment of the invention.

Referring to the sensing probe unit 210 described in FIG. 4, it will be noted that it is somewhat similar to the unit described in FIG. 2. Similar numbers describe similar parts except they are numbered in the "200" series. One major departure is in the internal cylindrical member 233 which instead of utilizing a standard pH glass blank as described at 37 in FIG. 2, it utilizes a dissolved oxygen sensing electrode 222 disposed in a known and standard solution 234 which is contained in cylindrical member 233 by a porous plug 230. As described in FIG. 2, a 7.0 pH buffer is contained in cylindrical member 240 and in contact with the outer surface of plug 230. Another difference between the FIG. 4 sensing electrode device and that of FIG. 2, is the positioning of the common ground 250 inside cylindrical member 240 instead of through the end wall 225. The placement is optional. It will also be noted that instead of a single plug for unit 220 an inner and outer cylindrical member 223 and 224 surround electrode 222 and extend through wall 225. Conductor 227 is attached to intermediate conductor 228 by connecting screw 26.

Figure 5:
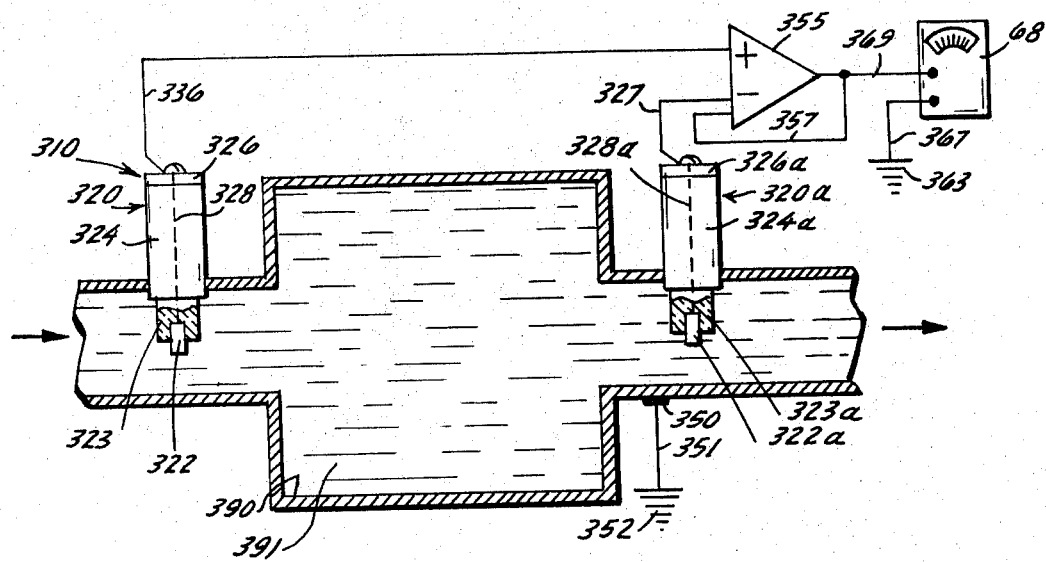
FIG. 5 is a view in partial vertical section and partially diagramatic of the electrode device as employed in a processing tank.

Turning to the electrode system described in FIG. 5, the sensing device 310 is different from those previously described in that two sensing electrode units 320 and 320a are spaced a substantial distance apart in a processing tank 390 containing a liquid 391 flowing in the direction of the arrow as indicated. As the two electrode sensing units 320 and 320a are the same as described for electrode unit 20 in FIG. 2, their component parts will not be individually described. In the FIG. 5 unit, it is noted that one differential amplifier 355 is indicated for the two electrode units 320 and 320a. It should be understood that this differential amplifier serves the same purpose as that described for amplifiers 55, 56 and 65 in the FIG. 2 self-compensating system. The processing tank 390 is of metallic composition and thus will conduct electricity. This has an advantage in that the common ground 350 can be made by attaching ground wire 351 directly to the tank with ground 352 providing the common ground with meter 68. This embodiment is similar to the FIG. 4 embodiment in the construction of the two-part cylindrical members 323, 323a, 324 and 324a surrounding the electrodes 322 and 322a.

OPERATION OF THE PREFERRED EMBODIMENT

A better understanding of the advantages of the preferred embodiment 10 will be had by a description of its operation. Probe 10 is placed in an aqueous solution such as 15 or 87 where dissolved oxygen is to be measured. The probe will be inserted such that sensing electrode 22 of unit 20 and the isolating member 40 of sensing unit 21 is surrounded by the solution. The level should be at least as high as indicated by the water level 88 as shown in container 89 or as high as indicated in FIG. 1. With sufficient electrical power being supplied to the amplifiers 55, 56 and 65, the electrical potential sensed by electrodes 22 and supplied to amplifiers 55, 56 and 65 will be an indication of the amount of dissolved oxygen in the liquid as compared to the amount of oxygen which may be simulated in the standard inner filler solution contained in pH blank 37 and the sensing tip 37a. The production of potential by electrodes of this general type as an indication of oxygen content is believed to take place as described in a copending patent application filed June 5, 1970 by the same inventors, Ser. No. 43,868 now U.S. Pat. No. 3,696,019. The electrical potential is accomplished by both electrodes 22 with common ground 50 through porous plug 45 and tip 37a. Any dissolved oxygen which may diffuse through plug 45 is blocked by the glass of tip 37a and cannot degrade the electrode. An indication of the dissolved oxygen in solution 87 will be read on meter 68 in control box 18 which is commonly grounded to electrodes 22 by grounds 63 and 52, and can be of the continuous recording type.

It will be noted that any temperature changes, pressure or age of materials will affect both sensing and measuring electrodes 22 in the same manner. However, the two sensing electrodes 22 measure only the difference between the oxygen content for the standard solution 34 and that contained in the solution to be analyzed 87, thus these environmental influences will affect both sensing materials in the same manner and in effect will not become a factor in their measurement with the electrodes measuring only the different oxygen contents between the two solutions.

As further explanation of the operation of the electrode system:

1. A potential is created between the active electrode in units 20 and 220 and the grounding electrode 48 and 250 respectively, which is a function of dissolved oxygen pH, salinity, oxygen reduction potential, temperature and numerous other things.

2. A potential is created between the standardized electrode in units 21 and 221 and the grounding electrode 48 and 250, respectively, which is a function of the thallous hydroxide inner filling solution 34 and 234 (which simulates some dissolved oxygen concentration), the pH difference between the inner and outer filling solutions 46 and 246, the salinity, pH, ORP, temperature and many other things including the solution which is being measured.

3. These two potentials are then impedance transformed and subtracted from each other in the differential amplifiers.

4. All the variations in the two potentials which are due to the grounding electrode are common to both signals and are therefore canceled in the subtraction at the differential amplifier.

In equation form, this is expressed as follows:

$E_1 = Eo_1(T) + KT/q \ln(C_1)$
$E_2 = Eo_2(T) + KT/q \ln(C_2)$

Where
$E_1$ = potential between the active electrode and screw
$E_2$ = potential between the standardized electrode and screw
$Eo_1(T)$ = characteristic potential of the electrode pair (temperature dependent)
$C_1$ = solution concentration
$C_2$ = solution concentration When the difference is taken;
$E_1 - E = KT/q \ln C_1/C_2$ Note that temperature dependent terms $Eo_1(T)$ and $Eo_2(T)$ are canceled.

5. The remaining signal coming from the differential amplifier is due to the dissolved oxygen in the unknown solution to be measured, the simultated DO of the inner filling solution and the difference in pH of the inner and outer filling solutions. This pH difference is adjusted by using the proper pH buffer solution until the output of the standardized electrode is equal to the output of the active electrode at some known DO concentration, say 1 part per million.

6. The output of the differential amplifier then represents the variation of the unknown solution in its concentration of DO from 1 part per million. Voltagewise this variation is about 58 millivolts for each tenfold increase in DO concentration. Thus, if the output is zero at 1 part per million, a +59 millivolts output would represent 10 parts per million of DO and a −59 millivolts output would represent 0.1 parts per million, i.e., the scale is logrithmic.

7. This same scheme holds true for any specific ion electrode, pH, ORP, sulfide, et cetera. The only requirement is that a stable standardizing solution is available.

8. The essence of this system is:
  a. An expensive and degradeable reference electrode is replaced by a screw 48 or a piece of platinum wire 150, 250 or 350.
  b. All factors common to the two electrode pairs (active and screw, and standard and screw) are canceled in the subtraction. In addition to the items mentioned in 1 and 2, the temperature dependence of the two specific ion electrodes is also canceled.
  c. The output is nulled (or zero) at some point in the range of measurement. This is not true if the active DO electrode is used with the usual reference electrode.

In this case at 1.0 ppm DO the output would be about 590 millivolts. Systems which take small differences between large values are subject to drift errors.

OPERATION OF THE ALTERNATIVE EMBODIMENTS

The operation of the alternative embodiments will now be explained. In the alternative embodiment described in FIG. 3, its operation is substantially the same as that described for the electrode probe 10 described in FIG. 2 except that the electrode unit 110 is employed to measure pH ion concentration and thus has two pH sensing electrodes 102 and 103.

The operation of the electrode sensing unit 210 is very similar to that described for unit 10 in FIG. 2 in that it also is employed to measure the dissolved oxygen content of a liquid. In the unit 210, electrical communication with the sensing electrode 222 in inner chamber 233 is made through two porous plugs 230 and 245 with the common ground 250 placed inside cylindrical member 240. This unit has the advantage of having the common ground internally protected but in its operation has been found not to be quite as accurate as unit 10 where the common ground is placed externally and in solution 87. The placement of the sensing electrode 222 inside the internal chamber 233 with solution 234 enclosed by plug 230 is an easier construction to manufacture.

Assuming it is desired to measure the ratio of dissolved oxygen content at two different locations in a stream or liquid 391, the flow of which is indicated by the arrow in FIG. 5, electrode unit 320 will be placed upstream of electrode unit 320a by positioning the measuring electrodes in the solution in a process tank 390. Electrical communication will be provided between the sensing electrodes 322 and 322a and ground 350 through the solution. As described for sensing probe 10, the electric potential will be a measurement of the difference in dissolved oxygen content and will be conducted from the electrode units 320 and 320a to the differential amplifier 355 with the difference being indicated on meter 68. Such differences will be a measurement of the differences in dissolved oxygen in the stream at the point where sensing electrode 322 is disposed and where sensing electrode 322a is positioned. As was stated in describing the operation of the electrode sensing device 10 in FIG. 1, any temperature changes, pressure or age of materials will affect both sensing electrodes 322 and 322a in the same manner. Thus, only the differences in electrical measurement will be indicated on meter 68 and any environmental effects will commonly affect both electrodes and thus be not a part of their final determination.

In the preferred and alternative embodiments previously described, dissolved oxygen type electrodes 22, 222, 322 and 322a are described for use in the self-compensating electrode system for measuring dissolved oxygen and sensing electrodes 181 are described for measuring pH. It should be understood that any type of sensing electrode could be employed such as electrodes which are used to sense oxidation reduction potentials and particular ions such as sulfide, nitrate, cyanide, fluoride, copper, bromide, cadmium, iodide, lead, fluoroborate, chloride, calcium, a divalent cation generally and perchlorate. If the system is to be used to measure a standard versus an unknown, the type of system would be employed as indicated in FIGS. 2, 3 and 4. If it is desired to measure oxidation reduction potential, commercially available platinum electrodes are substituted for electrodes 22 and 222 with one platinum electrode placed in a standardizing solution of quinhydrone in place of solutions 34 and 234. If the system is to be utilized to measure different ion conditions in a stream or at different points in a mass of liquid, it would be the same as that shown in FIG. 5.

As previously described, the composition of sensing electrodes 22, 222, 322 and 322a are 13 percent mercury with the balance being thallium. This particular alloy electrode is the subject matter of copending application Ser. No. 43,863, filed June 5, 1970, now U.S. Pat. No. 3,696,019, by the same inventors.

Cylindrical units 40, 140 and 240 are composed of a resinous plastic member such as polyvinyl chloride and the same is true with respect to tubular member 233, end wall members 141 and 241; closures 35, 135 and 235 as well as tubular sections 13, 14; and caps 11, 12 and 16. Insulating plugs or sleeves 23, 223, 224, 323, 323a, 324 and 324a are composed of a polyvinyl chloride material and connectors 226, 326 and 326a are crimp terminals. Ceramic plugs 45, 145, 230 and 245 are readily made by heat treating fire clay at elevated temperatures.

The metallic alloy electrodes 22, 222, 322 and 322a are fabricated in an electrode unit such as 20, 220 and 320 by bonding with epoxy adhesive. In the preferred form, all of the electronic components such as those illustrated in the broken line box showing of FIG. 1, will be secured inside tubular section 13 and cap 12. The necessary connections such as grounds between the meters and the common ground electrodes will be made through cable 17.

While amplifiers 55, 56 and 65 are described in the FIG. 1 device, it should be understood that a single differential amplifier such as 355 would be sufficient for the purpose of the present system if it had sufficient input impedance on both terminals. As will be apparent, various units such as the potentiometers 71 and 271 and the reed relays 76 and 276 could be eliminated without departing from the advantages of the present electrode unit.

It will thus be seen that there is now provided an electrode system for measuring various types of ion concentrations, which is simple in its construction yet is self-compensating in its determinations. The system is operable not only in measuring ion concentrations in relation to a standard media but also can be employed to measure differences in the ion or molecular concentrations at various positions in a solution or in a flowing stream. The electrode system can be fabricated from parts which are readily available and in the instance of the devices disclosed in FIGS. 2, 3 and 4 can be fabricated in a compact unit so that the operator has only a single piece of equipment to place in the solution to be tested.

The foregoing invention can now be practiced by those skilled in the art. Such skilled persons will know that the invention is not necessarily restricted to the particular embodiments presented herein. The scope of the invention is to be defined by the terms of the following claims as given meaning by the preceding description.

We claim:
1. A device for measuring ion concentration or electrode potential in an electrolytic test solution comprising:
a first measuring electrode means including a first sensing element and an electrolytic standard solution in contact therewith and containing ions corresponding with those to be measured in said test solution, said electrode means producing a first potential in response to said standard solution and said means being constructed and arranged for said standard solution to be placed in electrolytic contact with said test solution,
a second measuring electrode means including a second sensing element composed in the same material as the first sensing element, said second electrode means being constructed and arranged for being placed in said test solution for said second sensing element to produce a second potential in response to ions to be measured in said test solution,
a reference electrode means constructed and arranged for being in electrically conductive relationship with said test solution to be measured simultaneously with said first and second electrode means, said reference electrode means serving as a common electrical reference point for said first and second electrode means, said reference electrode means being connected to the zero volt reference of the measuring circuit, means for measuring the potential difference between said first electrode means and said reference electrode means, means for measuring the potential difference between said second electrode means and said reference electrode means, and means for measuring the differential potential between said measured potential differences.

2. The device claimed in claim 1 wherein each of said means for measuring the potential difference between said first electrode and said reference electrode and between said second electrode and said reference electrode comprises a non-inverting high input impedance amplifier means, each of said amplifier means having an output terminal, and non-inverting and inverting input terminals, the non-inverting terminal of one amplifier means being connected to the sensing element of said first electrode means and the non-inverting terminal of the other amplifier means being connected to the sensing element of said second electrode means, the inverting terminal of each amplifier means being connected to its output terminal respectively, each said amplifier means being for producing said potential on its outuput terminal corresponding to the potential it measures between its non-inverting terminal and said reference electrode, said means which measure the differential potential between said measured potential differences being connected between said amplifier means output terminals.

3. The device as claimed in claim 1 and including a buffering solution between said standard solution and said test solution of unknown ion concentration.

* * * * *

UNITED STATES PATENT OFFICE
CERTIFICATE OF CORRECTION

Patent No. 3,862,895   Dated 1-28-75

Inventor(s) Karl L. King et al

It is certified that error appears in the above-identified patent and that said Letters Patent are hereby corrected as shown below:

In claim 1, column 8, line 52, after "composed" cancel "in" and substitute ---of---.

In claim 2, column 10, line 7, cancel "outupt" and substitute ---output---.

Signed and sealed this 20th day of May 1975.

(SEAL)
Attest:

RUTH C. MASON
Attesting Officer

C. MARSHALL DANN
Commissioner of Patents
and Trademarks